United States Patent [19]
Chang

[15] 3,686,337
[45] Aug. 22, 1972

[54] METHOD OF REDUCING THE HALOGEN CONTENT OF HALOAROMATICS
[72] Inventor: Kuo Yuan Chang, 2214 Wyllip Court, Midland, Mich. 48640
[22] Filed: May 28, 1970
[21] Appl. No.: 41,553

[52] U.S. Cl. .......260/650 R, 260/465 G, 260/623 R, 260/646, 260/649 DP, 260/649 F, 260/650 F
[51] Int. Cl..............................................C07c 25/04
[58] Field of Search.260/623 R, 650, 650 F, 649 DP, 260/649 F, 465 G

[56] References Cited

UNITED STATES PATENTS 2,766,295 10/1956 Gleim....................260/621 R
3,054,830 9/1962 Luvisi et al.............260/650 R Primary Examiner—Howard T. Mars
Attorney—Griswold & Burdick, Herbert D. Knudsen and C. E. Rehberg

[57] ABSTRACT

Halobenzenes, halobiphenyls and halonaphthalenes are dehalogenated by heating the haloaromatic in the presence of a lower dialkanolamine or lower trialkanolamine for a time sufficient to give the desired reduction of the aromatic halogen content.

7 Claims, No Drawings

METHOD OF REDUCING THE HALOGEN CONTENT OF HALOAROMATICS

BACKGROUND OF THE INVENTION

The known art for dehalogenating halobenzenes generally involves either the catalytic disproportionation of polyhalobenzene with benzene or catalytic hydrogenolysis of polyhalobenzene. Such reactions are typified by Alquist et al. in U.S. Pat. No. 2,569,441; Redman et al. in U.S. Pat. No. 2,943,114; and Woodruff in U.S. Pat. No. 2,866,829. Although the efficacy of such halogen removal from benzene cannot be questioned, the solids problem caused by some inorganic catalysts have caused serious problems in commercial application.

SUMMARY OF THE INVENTION

According to the present invention, a polyhalobenzene, polyhalobiphenyl or polyhalonaphthalene is dehalogenated by contacting the halogenated aromatic with a lower dialkanolamine, trialkanolamine or mixture thereof at a temperature of about 100° to about 300°C. or more for a time sufficient to remove the desired number of aromatic halogens. By such process, no inorganic solids are present in the reaction to cause difficulty in separation. The use of alkanolamines which are easily separated by fractional distillation or other conventional means from the desired reaction product eliminates this problem.

The novel feature of the present invention is the use of a lower dialkanolamine, trialkanolamine or mixture thereof to remove aromatic halogen from polyhaloaromatics. The term "lower alkanolamine" is meant to encompass those alkanolamines having hydroxyalkyls of two to about four carbon atoms. Examples of the various alkanolamines that may be used in the present invention include: the dialkanolamines, such as diethanolamine, dipropanolamine and dibutanolamine; and trialkanolamines such as triethanolamine, tripropanolamine and tributanolamine. Of the alkanolamines that may be used in the invention, the trialkanolamines are of special interest, with the use of triethanolamine being of special importance.

The polyhaloaromatics may suitably be benzene, biphenyl or naphthalene containing at least two aromatic chlorines, bromines or mixtures thereof in addition to optional substituents that are not substantially affected by the reaction conditions. Representative examples of such inert substituents include lower alkyl, vinyl, allyl, hydroxyl, cyano, nitro or fluoro. Preferred halogenated aromatics contain only halogen substituents, with aromatics containing only chlorines being especially preferred. Benzenes containing at least three halogens are of special interest because of the useful products obtained upon dehalogenation. The arrangement of halogens on the aromatic nucleus is not critical.

Representative examples of suitable halogenated aromatics treated in the present invention include: chlorinated benzenes, such as di-, tri-, tetra-, penta- and hexachlorobenzene, 2,4-dichloronitrobenzene, octachlorostyrene, 2,3,6-trichlorophenol, pentachlorophenol, 2,6-dichlorobenzonitrile, pentachlorobromobenzene, 1,2,3-dichloro-4-fluorobenzene and 4,6-dichloro-2-sec-butylphenol; bromobenzenes, such as di-, tri-, tetra-, penta- and hexabromobenzene, 2,4,6-tribromotoluene, 2,3,4,6-tetrabromophenol, ar-pentabromoallylbenzene, 2,4,6tribromonitrobenzene and tetrabromodichlorobenzene; halogenated biphenyls, such as deca-, nona-, octa-, hepta-, hexa-, penta-, tetra-, tri- or dichloro- or bromobiphenyl, o-phenyl-2,4,5-trichlorotoluene and tetrabromo-o-phenyl phenol; and halogenated naphthalenes, such as octa-, hepta-, hexa-, penta-, tetra-, tri- or dichloro- or bromonaphthalene and heptachloronaphthol. Of these representative compounds, tetrachlorobenzene, pentachlorobenzene and hexachlorobenzene are of greatest importance.

The temperature is an important process variable. As noted, the temperature may suitably range from about 100° to about 300°C. or more during the dehalogenation. At temperatures below 100°, the reaction is generally too slow to be considered feasible on a commercial scale. At temperatures above 300°C., the increasing amount of undesirable by-products formed in the reaction deleteriously affect the desirability of using this means of dehalogenation. Within the broad temperature range of the invention, temperatures of about 125° to about 250°C. are preferred.

The pressure in the dehalogenation of the invention is not critical and the reaction is generally conducted in a closed container under autogenous pressure.

The ratios of the alkanolamine to the polyhalogenated aromatic may vary widely as different amounts of aromatic halogen are removed from the polyhalogenated compound. Of course, as more halogen is removed, more of the alkanolamine is required. Generally at least one mole of the alkanolamine is preferably employed to remove each equivalent of halogen, with the use of about 1.2 to about 7 moles or more of the alkanolamine per equivalent of halogen to be removed from the aromatic being especially preferred, and most economical removal being obtained at a molar ratio of about 2 to about 4 or more. Of course, more of the alkanolamine could be employed, but the greater bulk of material involved usually becomes excessive beyond these limits.

The major utility of this invention is directed toward aromatics halogenated to undesirable isomers or overhalogenated compounds obtained in commercial production. These derivatives may be converted to aromatic compounds having fewer halogens for rehalogenation or use as such. For example, the 1,2,3,4-tetrachlorobenzene in the chlorination of benzene to obtain the desired 1,2,4,5-tetrachlorobenzene may be dechlorinated to specifically obtain a predominance of 1,2,4-trichlorobenzene isomer. This isomer may be rechlorinated to get a specific reaction with a predominant yield of the desired 1,2,4,5-tetrachlorobenzene. Thus, in this example, undesirable isomers of tetrachlorobenzene are converted into useful products and no longer have to be disposed of on a commercial scale.

SPECIFIC EMBODIMENTS

Example 1

A mixture containing 2.8 g. of 1,2,3,4-tetrachlorobenzene and 6.0 g. of triethanolamine was sealed in a small steel bomb having a capacity of 10 cc. The bomb was heated at 150°C. for 56 hours, cooled to room temperature and opened. The contents of the bomb were poured into 10 ml. of concentrated hydrochloric acid and extracted with benzene. The benzene extract was analyzed by gas-liquid chromatography to have a composition by weight percent of 6.2 percent 1,2,3,4-tetrachlorobenzene, 11.3 percent 1,2,3-trichlorobenzene, 59.9 percent 1,2,4-trichlorobenzene and 22.6 percent ortho and para dichlorobenzene.

Example 2

A mixture containing 3.12 g. of pentachlorobenzene and 6.0 g. of triethanolamine was allowed to react in the same manner as described by Example 1 at a temperature of 150°C. for 56 hours. After a similar recovery, the product was analyzed to contain by weight: 14.6 percent pentachlorobenzene, 10.5 percent 1,2,3,4-tetrachlorobenzene, 55.0 percent 1,2,4,5- and 1,2,3,5-tetrachlorobenzene, 1.6 percent 1,2,3-trichlorobenzene, 16.6 percent 1,2,4-trichlorobenzene, 1.0 percent 1,3,5-trichlorobenzene and 0.7 percent dichlorobenzenes.

In the same manner as described in the examples, polyhalogenated benzene, biphenyl and naphthalene compounds, such as those described above, may be dehalogenated by heating the haloaromatic at a temperature of about 100° to about 300°C. or more in the presence of diethanolamine, triethanolamine, dipropanolamine, tripropanolamine, dibutanolamine, tributanolamine or mixture thereof for a time sufficient to give the desired removal of halogens from the aromatic nucleus.

I claim:

1. A method for dehalogenating a polyhaloaromatic compound selected from the group consisting of polyhalobenzene, lower alkyl polyhalobenzene, polyhalobiphenyl and polyhalonaphthalene containing at least two halogen atoms wherein the halogen is chlorine, bromine or mixtures thereof comprising heating the polyhaloaromatic to a temperature of about 100° to about 300°C. at autogenous pressure in the presence of a lower dialkanolamine, lower trialkanolamine or mixture thereof wherein the molar ratio of the alkanolamine to the polyhaloaromatic is at least 1 to about 7 moles of alkanolamine per equivalent of halogen to be removed from the polyhaloaromatic.

2. The process of claim 1 wherein the alkanolamine is a lower trialkanolamine.

3. The process of claim 2 wherein the trialkanolamine is triethanolamine.

4. The process of claim 1 wherein the polyhaloaromatic has only chlorine substituents.

5. The process of claim 1 wherein the polyhaloaromatic is benzene containing at least three halogen atoms.

6. The process of claim 1 wherein the molar ratio of the alkanolamine to the polyhaloaromatic is about 2 to about 4 moles of alkanolamine per equivalent of halogen to be removed from the polyhaloaromatic.

7. The process of claim 1 wherein the temperature is about 125° to about 250°C.

* * * * *